US008666755B1

(12) United States Patent
McManus et al.

(10) Patent No.: US 8,666,755 B1
(45) Date of Patent: *Mar. 4, 2014

(54) METHOD FOR FORECASTING HOUSING PRICES USING A DYNAMIC ERROR CORRECTION MODEL (71) Applicant: Federal Home Loan Mortgage Corporation, McLean, VA (US)

(72) Inventors: Douglas Alexander McManus, Bethesda, MD (US); Sol T. Mumey, Calgary (CA)

(73) Assignee: Federal Home Loan Mortgage Corporation, McLean, VA (US)

( * ) Notice: Subject to any disclaimer, the term of this patent is extended or adjusted under 35 U.S.C. 154(b) by 23 days.

This patent is subject to a terminal disclaimer.

(21) Appl. No.: 13/658,575

(22) Filed: Oct. 23, 2012

Related U.S. Application Data

(63) Continuation of application No. 12/402,923, filed on Mar. 12, 2009, now Pat. No. 8,301,459, and a continuation of application No. 09/728,061, filed on Dec. 4, 2000, now Pat. No. 7,509,261.

(60) Provisional application No. 60/168,755, filed on Dec. 6, 1999.

(51) Int. Cl.
*G06Q 10/00* (2012.01)
(52) U.S. Cl.
USPC ............................................ 705/1.1
(58) Field of Classification Search
USPC ............................................ 705/1.1
See application file for complete search history.

(56) References Cited

U.S. PATENT DOCUMENTS

| 5,857,174 | A | 1/1999 | Dugan |
| 6,115,694 | A | 9/2000 | Cheetham et al. |
| 6,401,070 | B1 | 6/2002 | McManus et al. |
| 6,609,109 | B1 | 8/2003 | Bradley et al. |

OTHER PUBLICATIONS

Difference Between Forecasting and Estimating; Dictionary meaning of Forecasting and Estimatin, printed from www.dictionary.com on Nov. 5, 2008.
Brown et al.; Forecasting UK House Prices: A Time Varying Coefficient Approach; 1997; University of Abertay Dundee; University of Surrey.
Acxiom/DataQuick Announces Commerical Availability of Freddie Mac's Home Valuation Estimator, Sep. 8, 1998, Business Wire.
Tu; Valuing New Urbanism: An Empirical Examination of Traditional Neighborhood Developments; Oct. 1999; The Georgetown University.
List Plurality of Homes Sold in a Subdivision from MRIS Database (hereinafter known as "MRIS"); 1997-1998, labeled as MRIS.

(Continued)

*Primary Examiner* — Naresh Vig
(74) *Attorney, Agent, or Firm* — Finnegan, Henderson, Farabow, Garrett & Dunner, LLP (57) ABSTRACT

A system and method for forecasting a price of a property in a first housing sub-market based on data related to a second housing sub-market are described. A price index is derived for the second housing sub-market, and an error correcting function is calculated for the first housing sub-market. A price index for the first housing sub-market is derived from the second sub-market price index and the error correcting function. An estimate of the price of the price of the property in the first housing sub-market is then provided. The estimate of the price can be used as the basis for an economic decision.

22 Claims, 3 Drawing Sheets

(56) References Cited

OTHER PUBLICATIONS

Grudnitski et al.; Adjusting the Value of Houses Located on a Golf Course; The Appraisal Journal; Jul. 1997; vol. 65, 3; ABI/INFORM Global; pp. 261-266.

Bradley et al.; Evaluating Collateral in the Next Millennium; Outline for SMM Article.

Uniform Residential Appraisal Report; Jun. 1993.

Bailey et al.; A Regression Method for Real Estate Price Index Construction, Journal of the American Statistical Association; 1963; vol. 58; pp. 933-942.

Granger et al.; Forecasting Economic Time Series; Academic Press; San Diego, CA; Second Edition; 1986; pp. 224-226.

Hamilton; Time Series Analyses; Princeton University Press, Princeton; NJ; 1994; pp. 580-581.

Poirier; The Econometrics of Structurel Change; University of Toronto, Department of Political Economy et al.; North-Holland Publishing Company; 1976; pp. 9-20.

Venables et al.; Modern Applied Statistics with S-Plus; University of Adelaide, Department of Statistics, South Africa; Springer-Verlag; 1994; pp. 247-250.

CATC, Systemic Risks in Residential Property Valuations, Jun. 2005.

METHOD FOR FORECASTING HOUSING PRICES USING A DYNAMIC ERROR CORRECTION MODEL

CROSS REFERENCE TO RELATED APPLICATIONS

This application is a continuation application of U.S. application Ser. No. 12/402,923, filed on Mar. 12, 2009, (now allowed) which is a continuation of U.S. application Ser. No. 09/728,061, filed Dec. 4, 2000, which issued on Mar. 24, 2009, as U.S. Pat. No. 7,509,261, which claims priority to U.S. Provisional Application No. 60/168,755, filed Dec. 6, 1999, all of which are incorporated by reference herein in their entirety.

This application is related to the U.S. patent application Ser. No. 08/730,289, filed Oct. 11, 1996, by Michael Bradley et al., entitled "Method for Containing House Price Forecasts," the disclosure of which is expressly incorporated herein by reference in its entirety. This application is also related to U.S. patent application Ser. No. 09/115,831, filed Jul. 15, 1998, by Douglas McManus et al., entitled "System and Method for Providing House Price Forecasts Based on Repeat Sales Model," the disclosure of which is expressly incorporated herein by reference in its entirety.

BACKGROUND OF THE INVENTION

I. Field of the Invention

The present invention generally relates to methods for forecasting house prices for a property. More particularly, the invention relates to a method for providing house price forecasts by refining the precision of a price index for a housing submarket by using a separate geographically correlated index. According to the present invention, the index is estimated by a modified form of a repeat-sales model.

II. Background and Material Information

The goal of a repeat-sales index is to determine house price appreciation in a particular market. The market, however, is not homogeneous, and hence its definition is vague. In addition to the standard geographical variation, property type is an important separator of markets. For example, condominium property appreciation is substantially different from single family house price appreciation. As a result, using a single family house price index (or an aggregate single family and condominium price index) to model condominium appreciation results in significant errors. In addition, the amount of data available for estimating condominium price indices is typically less than one thirtieth of the amount available for estimating single family indices. There are insufficient observations to estimate a standard repeat-sales model index at the same geographical specificity for condominium properties as for single family houses.

SUMMARY OF THE INVENTION

The present invention, referred to herein as the "dynamic error correction model," balances the competing goals of minimizing bias due to geographic aggregation and accounting for systematic differences between property types.

The dynamic error correction model of the present invention solves the problem of insufficient data by allowing extrinsic information to enter into the model, such that the form of the model remains the same as that of a standard repeat-sales model but the dependent variables are adapted to reflect the extrinsic information. For instance, for condominium index estimation, the extrinsic information is the county-level single family house price indices. The dependent variable in the model becomes the error made by the single family indices in forecasting the empirical condominium price appreciation. While not a requirement of the invention, this correction factor is fit at a higher level of geographic aggregation level.

The principles and aspects of the present invention can be applied to other subdivisions of the real estate market, such as two, three, and four family houses, multifamily (i.e., five or more family) properties, investor properties, manufactured housing, houseboats, commercial properties, and land. It can also be used to estimate an index at finer levels of disaggregation, for example, by estimating a ZIP code level index through its deviation with the county level index. It can also be used to refine the estimates within a modeled sub-market, for example by allowing variations in a given market for price tier. Moreover, it can also be applied to models of non-real estate properties, such as personal property.

BRIEF DESCRIPTION OF THE DRAWINGS

The accompanying drawings, which are incorporated in and constitute a part of this specification, illustrate various features and aspects of the invention and, together with the description, serve to explain the objects, advantages and principles of the invention. In the drawings.

DETAILED DESCRIPTION OF THE PREFERRED EMBODIMENTS

Reference will now be made in detail to the present preferred embodiments of the invention, an example of which is illustrated in the accompanying drawings. Wherever possible, the same reference numbers will be used throughout the drawings to refer to the same or like parts.

Figure 1:
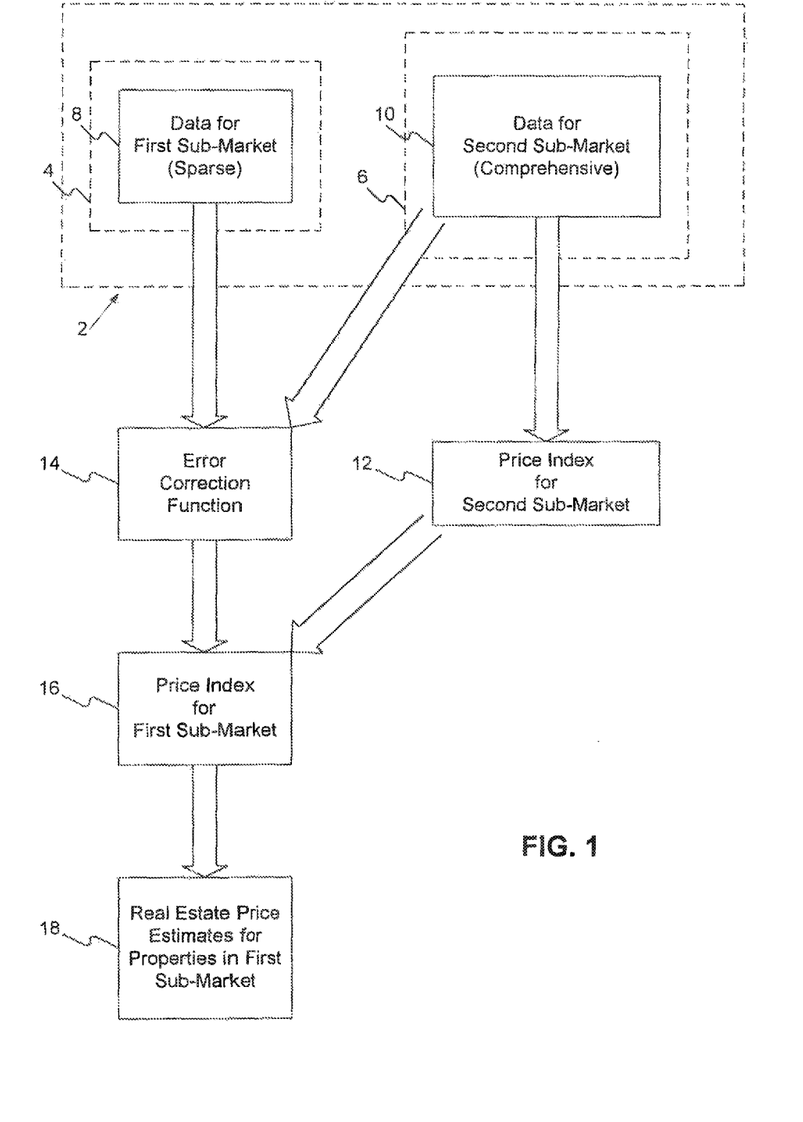
FIG. 1 is a schematic drawing of the method in accordance with the present invention.

Turning to FIG. 1, a schematic drawing of the method of the present invention is illustrated. A real estate transactions market 2 comprises several real estate transaction sub-markets, including a first sub-market 4 and a second sub-market 6. Each sub-market could represent a subdivision of the entire real estate market 2, such as single family home sales, condominium sales, or sales in a particular geographic market. As such, each sub-market has a collection of data corresponding to transactions within that sub-market. The first sub-market has a collection of data 8 associated with transactions in the first sub-market, but the collection is sparse at best and generally inadequate for predictive purposes. The second sub-market has a collection of data 10 associated with transactions in the second sub-market. Collection of data 10 is comprehensive, reflecting a multitude of transactions which provide a basis for predicting future transaction characteristics.

Data 10 can be processed to create price index 12 for the second sub-market. The plentitude of data facilitates the calculation of an accurate price index 12 for predicting future real estate transaction prices in the second sub-market. Price index 12 will also be used as the basis for predicting transaction prices in the first market. However, before this is possible, an error correction function 14 must be derived from sparse first sub-market data 8 and comprehensive second market data 10. This error correction function correlates the price indices from sparse first sub-market data 8 and from comprehensive second market data 10. Error correction function 14 and price index 12 for the second sub-market are mathematically combined to obtain a price index 16 for the first sub-market. Finally, real estate transaction price estimates 18 for the first sub-market are computed based on price index 16.

Figure 2:
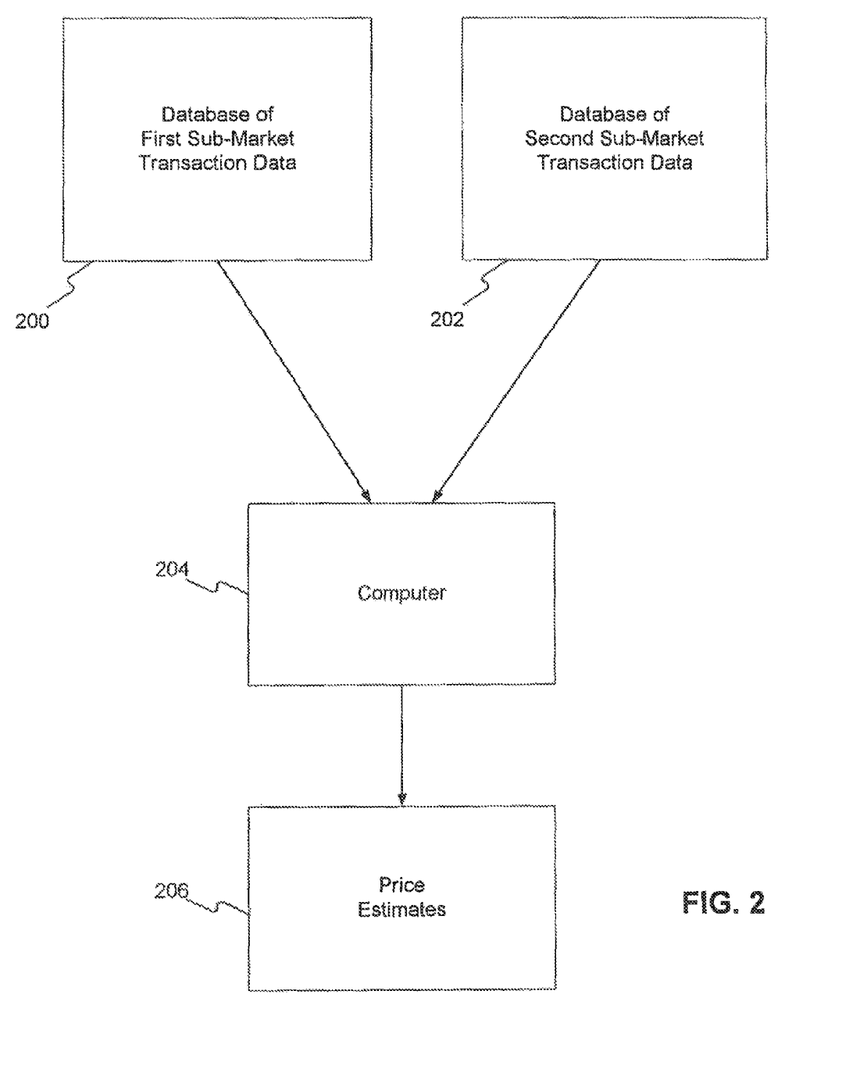
FIG. 2 is a schematic drawing of a system in accordance with the present invention.

Turning to FIG. 2, a system in accordance with the present invention is illustrated. A first database 200 contains transaction data from the first sub-market and a second database 202 contains transaction data from a second sub-market. Generally, second database 202 is much more comprehensive than is first database 200. Computer 204 extracts data from second database 202 to determine a price index for the second sub-market. Then, computer 204 extracts data from both first database 200 and second database 202 to create a error correction function correlating the two sets of data. From this error correlation function, and the price index for the second sub-market, computer 204 calculates a price index for the first sub-market. Based on this price index for the first sub-market, the computer can output price estimates 206 relating to properties in the first sub-market.

First database 200 and second database 202 may be either publicly available databases or proprietary databases. Moreover, first database 200 and second database 202 may be the same database.

The method of the present invention can be applied to many subdivisions of the real estate market, such as condominiums, two, three, and four family houses, multifamily (i.e., five or more family) properties, investor properties, manufactured housing, houseboats, commercial properties, and land. These subdivisions of the real estate market may act as the first housing sub-market, with the single family house market acting as the second housing sub-market, for example.

The method can also be used to estimate an index or prices at finer levels of disaggregation, for example, by estimating a ZIP code level index through its deviation with the county level index. Those skilled in the art will undoubtedly devise many other such disaggregated market combinations without departing from the spirit of the present invention. Moreover, the method can be used to refine the estimates within a modeled sub-market, for example by allowing variations in a given market for price tier.

Finally, the method may also be applied to models of non-real estate properties, such as personal property. In a market where such property is not readily bought and sold, property values are exceedingly difficult to evaluate. For example, in the market for supercomputers, where transactions are infrequent, values for supercomputers may not be apparent. However, using the instant method, price estimates and a price index for supercomputers may be derived from transaction data coming from the greater computer market.

The derivation of the mathematical formulae underlying the method of present invention will now be described. The method of the invention can be illustrated by its application to the creation of a house price index for condominium properties. The error ($K_{ts}$) made in forecasting the house price appreciation by the single family index for a condominium property transacting at a first time of t and a second time of s is defined as:

$$K_{ts} = p_s - p_t - [I^{sf}(s) - I^{sf}(t)], \quad (1)$$

where $p_t$ is the log of the first transaction value of the condominium property at time t, $p_s$ is the log of the second transaction value of the condominium property at time s, and $I^{sf}(\tau)$ is the log single family index value at time $\tau$ (=t or s).

The condominium error correction ($K_{ts}$) defined above by equation (1) can be estimated by the following formula:

$$K_{ts} = C(s) - C(t) + u_c, \quad (2)$$

where $C(\tau)$ is the unknown condominium error correction function at time $\tau$ (=t or s) and $u_c$ is a stochastic error term related to the condominium error correction.

Various methods and techniques, such as those described in U.S. patent application Ser. Nos. 08/730,289 and 09/115,831, may be used to estimate the condominium error correction function $C(\tau)$. The methods for estimating $C(\tau)$ include non-parmetric methods, such as linear spline estimation with endogenous knot point selection.

The condominium price index $I^{co}(\tau)$ at time $\tau$ (=t or s) can be constructed as the sum of the single family index $I^{sf}(\tau)$ and the condominium error correction $C(\tau)$, as represented by the following formula:

$$I^{co}(\tau) = I^{sf}(\tau) + C(\tau) \quad (3)$$

An example of a repeat-sales model for estimating single family indices is $$p_s - p_t = I^{sf}(s) - I^{sf}(t) + u_{sf} \quad (4)$$

where $p_t$ is the log of the first transaction value of the single family property at time t, $p_s$ is the log of the second transaction value of the single family property at time s, $I^{sf}(\tau)$ is the log single family index value at time $\tau$ (=t or s), and $u_{sf}$ is a stochastic error term related to the single family indices.

The equation (2) is in the same form as the repeat sales model (4), with the error term, $K_{ts}$ substituted for the log appreciation, $p_s - p_t$ and the condominium error correction function, $C(\tau)$ substituted for the index, $I^{sf}(\tau)$. In equations (2) and (4), the index, $I^{sf}(\tau)$ can be calculated using various techniques and methods, including those described in U.S. patent application Ser. No. 09/115,831.

The condominium error correction can be estimated with standard repeat-sales procedures. The advantage of estimating the condominium index as deviations from the single family index is that while the actual path of the condominium index may be complex, requiring a lot of data to accurately estimate, in contrast, the difference between the single family and condominium indexes tends to be an easily approximated function. Thus, in practice, the estimation of equation (2) requires a relatively low order linear spline to provide an adequate estimate.

If it is known that at time t, the property in question sold for $p_t$, then the house price forecast $F_s$ for time s, is given by the following:

$$F_s = \exp[\log(P_t) + I^{co}(s) - I^{co}(t)]. \quad (5)$$

Figure 3:
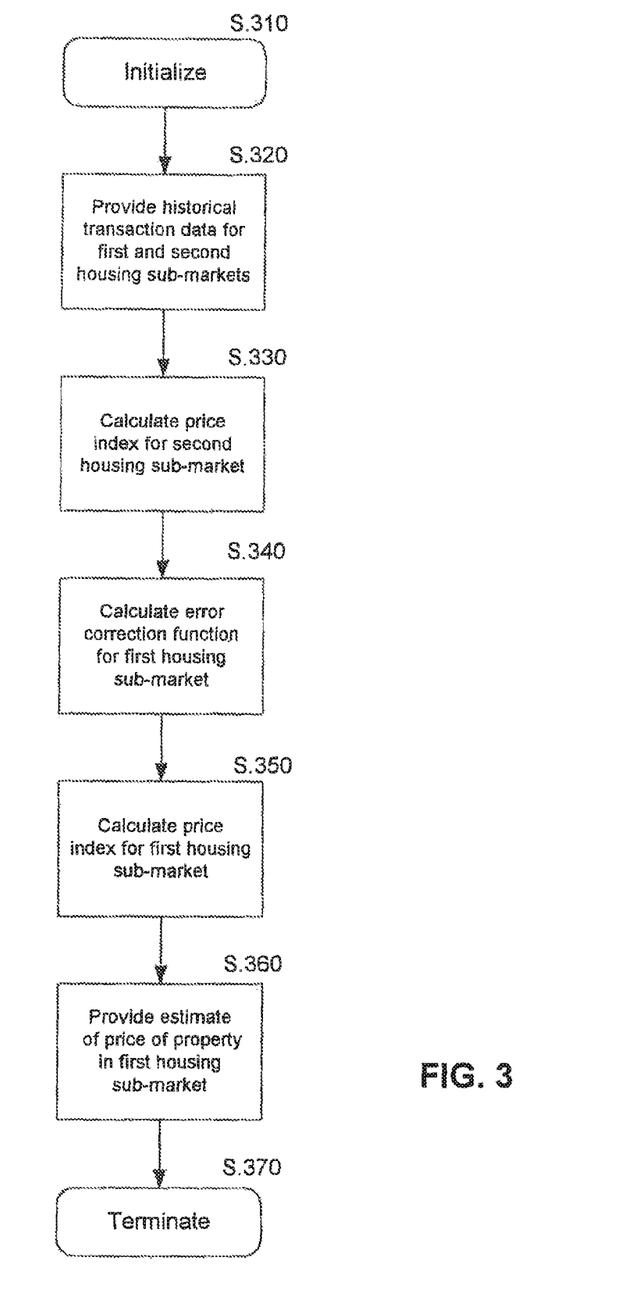
FIG. 3 is an exemplary flowchart of the various processes and operations for forecasting property prices, in accordance with the principles of the present invention.

In order to provide an illustration of the principles and aspects of the invention, FIG. 3 is an exemplary flowchart of a method for forecasting the price of a condominium property (i.e., a property in a first housing sub-market) based on a price index of single family houses (i.e., properties in a second housing sub-market). The features of FIG. 3 may be implemented through any suitable combination of hardware, software and/or firmware. For example, the various steps illustrated in FIG. 3 can be implemented through a software-based application executed with a computer or workstation.

After initializing the application (step S.310), historical transaction data related to the condominium and single family properties are gathered and provided for processing (step S.320). In general, historical transaction data relates to repeat sales data for each property at time t and time s. Historical transaction data may be collected for all properties of a similar-type (i.e., condominiums or single family houses) that are within a geographical area defining the first housing sub-market or the second housing sub-market. The historical transaction data may be collected from local or national databases, including databases that are proprietary, commercially available or generally accessible by the public.

As illustrated in FIG. 3, the price index or inflation values for the second housing sub-market is calculated (step S.330). The house price inflation values for single family houses in the second housing sub-market may be determined based on the repeat sales model of equation (4). Using the historical transaction data, the single family indices $I^{sf}(\tau)$ may be determined at time t and time s. As described above, the techniques and methods described in U.S. patent application Ser. No. 09/115,831 may be used for this purpose in order to determine the house price inflation in the second housing sub-market. For example, regression techniques can be utilized to determine the single family indices $I^{sf}(\tau)$ based on the historical transaction data provided for each of the properties in the second housing sub-market.

The error correction function $C(\tau)$ is then determined for the first housing submarket based on the determination of the $I^{sf}(\tau)$ values (step S.340). Preferably, this step is performed using the above-described equations (1) and (2). To calculate the error correction function $C(\tau)$, various methods and techniques may be employed, such as those described in U.S. patent application Ser. Nos. 08/730,289 and 09/115,831. The methods for estimating $C(\tau)$ include nonparmetric methods, such as linear spline estimation with endogenous knot point selection.

After determining the condominium error correction function $C(\tau)$, the price index for the first housing sub-market is determined (step S.350). Using the calculated values of $C(\tau)$ and $I^{sf}(\tau)$, the condominium price index $I^{co}(\tau)$ can be determined using, for example, the above-described equation (3). Further, with the condominium price index $I^{co}(\tau)$, an estimate of the price of a particular condominium property in the first housing sub-market can be provided (step S.360). For example, if it is known that at time t that the condominium property in question sold for $P_t$, then a house price forecast $F_s$ for time s can be determined based on equation (5) in accordance with the following: $F_s = \exp[\log(P_t) + I^{co}(s) - I^{co}(t)]$. After providing the estimate, the method of FIG. 1 can be terminated (step S.370).

The principles and aspects of the present invention can also be implemented in a way that accounts for differences in measurements of value between purchase transactions and refinance transactions, as described in U.S. patent application Ser. No. 09/115,831. In such cases, equations (1)-(5) and FIG. 1 may be adapted to take into account historical data related to purchase and refinance transactions. For example, the error $(K_{ts})$ made in forecasting the house price appreciation by the single family index for a condominium property transaction at a first time of t and a second time of s can be defined as follows:

$$K_{ts} = p_s - p_t - [I^{sf}(s) - I^{sf}(t) + D_1^{sf}(t) \cdot R_{t1}], \quad (6)$$

where $p_t$ is the log of the first transaction value of the condominium property at time t, $p_s$ is the log of the second transaction value of the condominium property at time s, $I^{sf}(\tau)$ is the log index value at time $\tau$ (=t or s), $D_1^{sf}(\tau)$ represents the single family first transaction refinance bias at time $\tau$ (=t or s), and $R_{t1}$ is one if the first transaction is a refinance and zero otherwise.

The condominium error correction $(K_{ts})$ defined above by equation (6) can be estimated by the following formula:

$$K_{ts} = C(s) - C(t) + D_2^{co}(s) \cdot R_{s2} - D_1^{co} \cdot R_{t1} + u_c, \quad (7)$$

where $C(\tau)$ is the unknown condominium error correction function at time $\tau$ (=t or s), $D_1^{co}(\tau)$ represents the condominium, first transaction refinance bias at time $\tau$ (=t or s), $D_2^{co}(\tau)$ represents the condominium, second transaction refinance bias at time $\tau$ (=t or s), $R_{t1}$ is one if the first transaction is a refinance and zero otherwise, $R_{s2}$ is one if the second transaction is a refinance and zero otherwise, and $u_c$ is a stochastic error term related to the condominium error correction.

An example of a repeat-sales model that can be used for estimating single family indices is $$p_s - p_t = I^{sf}(s) - I^{sf}(t) + D_2^{sf}(s) \cdot R_{s2} - D_1^{sf}(t) \cdot R_{t1} + u_{sf}, \quad (8)$$

where $p_t$ is the log of the first transaction value of the single family property at time t, $p_s$ the log of the second transaction value of the single family property at time s, $I^{sf}(\tau)$ is the log single family index value at time $\tau$ (=t or s), $D_1^{sf}(t)$ is the single family, first transaction refinance bias at time t, $D_2^{sf}(s)$ is the single family, second transaction refinance bias at time s, $R_{t1}$ is one if the first transaction at time t is a refinance and zero otherwise, $R_{s2}$ is one if the second transaction at time s is a refinance and zero otherwise, and $u_{sf}$ is a stochastic error term related to the single family indices.

The equation (7) is in the same form as the repeat sales model (8), with the error term, $K_{ts}$ substituted for the log appreciation, $p_s - p_t$ and the condo error correction function, $C(\tau)$ substituted for the index, $I^{sf}(\tau)$. The condominium error correction can be estimated with standard repeat-sales procedures.

The condominium price index $I^{co}(\tau)$ can be constructed as the sum of the single family index $I^{sf}(\tau)$ and the condominium error correction $C(\tau)$, as represented by the following:

$$I^{co}(\tau) = I^{sf}(\tau) + C(\tau) \quad (9)$$

Point forecasts at time s based on a transaction value at time t are made using the following equations:
1. If it is known that at time t, the property in question sold for $P_t$, then the house price forecast $F_s$ for time s, is given by the following:

$$F_s = \exp[\log(P_t) + I^{co}(s) - I^{co}(t)]. \quad (10)$$

2. If it is known that at time t, the property in question refinanced and was appraised for $P_t$, then the house price forecast $F_s$ for time s, is given by the following:

$$F_s = \exp[\log(P_t) + I^{co}(s) - I^{co}(t) - D_1^{co}(t)]. \quad (11)$$

Finally, there are cases in which the selection effects of a refinance transaction need to be included. For example, in evaluating a pool of refinance transactions funded in a given quarter, this pool would be subject to a refinance selection effect.

3. If it is known that, at time t, the property in question sold for $P_t$, then the house appraised value forecast $F_s$ for a refinance at time s, is given by the following:

$$F_s = \exp[\log(P_t) + I^{co}(s) - I^{co}(t) + D_2^{co}(s)]. \quad (12)$$

4. If it is known that, at time t, the property in question refinanced and was appraised for $p_t$, then the house appraised value forecast $F_s$ for a refinance at time s, is given by the following:

$$F_s = \exp[\log(P_t) + I_{co}(s) - I^{co}(t) + D_2^{co}(s) - D_1^{co}(t)]. \quad (13)$$

The teachings and principles of the present invention can be used for a wide array of applications and markets. For example, the condominium market in Anchorage, Ak. provides a useful example for illustrating the principles and aspects of the invention. From 1985, the condominium market in Anchorage, Ak. has experienced 4 different periods of price changes: from 1985 through 1988 condominiums lost about 13% of their value per year; in 1989 condominiums appreciated about 1%; from 1990 through 1993 they appreciated about 3.5% per year; and from 1994 through 1999 they have appreciated by about 2.5% per year. Estimating the condominium index directly would require enough data to identify the 4 regimes accurately, yet the data is relatively sparse. Historical transactions data for property sub-markets (such as the condominium market in Anchorage, Ak.) can come from various sources, such as Freddie Mac mortgage purchases, government data, including Federal Housing Administration (FHA) data, and data purchased from data firms, such as DataQuick/Acxiom. The historical transaction data can also be collected from county and town records.

The present invention, as applied in this example, measures the appreciation in condominium properties relative to the appreciation in single family properties. Over the same 1985-1999 period, the appreciation pattern for single family properties in Anchorage, Ak. had 3 different periods of house price appreciation. In particular, from 1985 through 1988 they lost about 10% of their value per year; from 1989 through 1993 they gained about 4% in value per year, and from 1994 through 1999 they have gained about 3% per year. For this example, there is ample data for estimating the single family index using, for example, equation (4).

Measured relative to the single family house price appreciation, condominium properties have experienced only 2 regimes. Namely, from 1985 through 1989 they experienced 3% less appreciation per year than single family properties; and from 1990 through 1999 they experienced 0.5% less appreciation per year than single family properties. Thus, using the principles of the invention requires the estimation of only 2 regimes when measured relative to single family properties.

To illustrate the features of the invention in more detail, consider the log of single family index $I^{sf}(\tau)$ as estimated by equation (4), which for the example described above would be:

$$I^{sf}(\tau) = -(0.03/4) * \tau \text{ for } \tau \text{ less than or equal to 23}$$

$$= -[(0.03/4) * 23 + (0.04/4) * (\tau - 23)] \text{ for }$$

$$\tau \text{ between 24 and 43}$$

$$= -[(0.03/4) * 23 + (0.04/4) * 20 + (-0.10/4) * (\tau - 43)] \text{ for }$$

$$\tau \text{ between 44 and 55}$$

where $\tau$ is the number of quarters from the current quarter. For this example, suppose the current quarter is fourth quarter 1999.

Now consider a repeat sales condominium observation that has a first sale in the first quarter of 1990 for $100,000 and a second sale in the first quarter of 1992 at $107,500. Measuring from the 4th quarter of 1999, in this observation s=31 and t=39 and based on the equation above $I^{sf}(31)=-0.25$ and $I^{sf}(39)=-0.33$. Further, using equation (1), $K_{ts}$ is calculated as follows:

$$K_{ts} = p_s - p_t[I^{sf}(31) - I^{sf}(39)]$$

$$= \log(107,500) - \log(100,000) - [-0.25 + 0.33]$$

$$= 11.58525 - 11.51293 - (0.08)$$

$$= -0.00768$$

Using the collection of the $K_{ts}$ from all of the repeat sales transactions for condominium properties, the error correction function can be calculated with equation (2), which for this example is calculated as follows:

$$C(\tau) = -(-0.005/4) * \tau \text{ for } \tau \text{ less than or equal to 39}$$

$$= -[(-0.005/4) * 39 + (-0.03/4) * (\tau - 39)] \text{ for }$$

$$\tau \text{ greater than 39.}$$

Therefore, using equation (3) an expression for the log of condominium house price index can be obtained as follows:

$$I^{co}(\tau) = I^{sf}(\tau) + C(\tau)$$

$$= -[(0.03/4) * \tau + (-0.005/4) * \tau] \text{ for }$$

$$\tau \text{ less than or equal to 23}$$

$$= -[(0.03/4) * 23 + (0.04/4) * (\tau - 23) +$$

$$(-0.005/4) * \tau] \text{ for } \tau \text{ between 24 and 39}$$

$$= -[(0.03/4) * 23 + (0.04/4) * (\tau - 23) +$$

$$(-0.005/4) * 39 + (-0.03/4) * (\tau - 39)] \text{ for }$$

$$\tau \text{ between 40 and 43}$$

$$= -[(0.03/4) * 23 + (0.04/4) * 20 + (-0.10/4) * (\tau - 43) +$$

$$(-0.005/4) * 39 + (-0.03/4) * (\tau - 39)] \text{ for }$$

$$\tau \text{ between 44 and 55.}$$

Finally, to estimate the current value of a condominium property that sold in the first quarter of 1992 at $107,500, equation (5) can applied as follows (with s set to 0):

$$F_0 = \exp\{\log(107,500) + I^{cc}(0) - I^{cc}(31)\}$$
$$= \exp\{11.58525 + 0 - (-.21)\}$$
$$= \exp\{11.79525\}$$
$$= 132,621$$

Therefore, the price forecast for the condominium property in question is $132,621.

When price indices and price estimates are forecast by the method disclosed herein, these prices can be used as the bases for economic decisions. Such economic decisions may comprise a decision whether to purchase the property, a decision whether to sell the property, a decision whether to rely upon an appraisal of the property, or a decision whether to update an appraisal of the property. The forecast prices and price indices may also be utilized in the context of a foreclosure sale on the property; they can both alter potential bids made at foreclosure sales.

Moreover, these economic decisions could comprise a decision concerning a loan secured by the property, including a decision whether to purchase the loan, a decision whether to guard against credit risk on the loan, a decision regarding a course of action when the loan is in default, or a decision regarding pricing the property for foreclosure sale. In particular, the forecast prices allow a buyer of mortgages to evaluate the riskiness of its purchase and to evaluate the risk premium incorporated in the purchase price of the mortgages.

Similarly, the forecast prices can be used in deciding whether to update or forego an appraisal on a property before buying a property or a mortgage thereon. For seasoned mortgages, i.e., those which originated more than 12 months ago, the price estimates can be used to recertify the value of a property before buying an underlying mortgage or pool of mortgages. Recertification may include a determination of whether the owner of the property still has a minimum required percentage of equity in the property.

In the area of seriously delinquent mortgages, the price forecasts and price indices can be used to decide how to triage and how to handle such mortgages.

In the area of mortgage backed securities, the property price estimates and price indices can be used to monitor the risk of a portfolio of mortgages which underlie such securities. Similarly, the price forecasts can be used to manage prepayment risk of these same underlying mortgages.

Once a pool of mortgages are purchased, the property price forecasts and price indices can be used to check the quality of the mortgages. For example, if the sales price for the purchased mortgage pool is not in line with the forecast property values produced by the instant invention, then the purchaser may rescind the purchase or quickly resell the pool.

The forecasts of the present invention may also be used to make high-level qualitative judgments about the real estate and mortgage markets. In particular, a buyer and seller of mortgages may use the forecasts to determine whether to increase or decrease its activities in a particular sub-market. For example, if a particular housing market or geographic market appears attractive based on the forecasts, the buyer/seller may choose to become more active in that market.

Finally, the forecast price indices and forecast property prices can be sold for profit.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for forecasting property prices, the method comprising:
   retrieving first historical transaction data of a first property sub-market from a first database;
   retrieving second historical transaction data of a second property sub-market from a second database;
   calculating, by at least one computer processor, a second price index of the second property sub-market based on the retrieved second historical transaction data;
   calculating, by the at least one computer processor, an error correction function based on the retrieved first historical transaction data and the calculated second price index;
   calculating, by the at least one computer processor, a first price index based on the calculated error correction function and the calculated second price index;
   forecasting a price of property in the first property sub-market based on the calculated first price index; and
   storing the forecasted price in a memory device.

2. The computer-implemented method of claim 1, wherein the retrieved second historical transaction data includes more transactions than the retrieved first historical transaction data.

3. The computer-implemented method of claim 1, wherein the first property sub-market and second property sub-market are housing sub-markets.

4. The computer-implemented method of claim 3, wherein the first property sub-market is a condominium sub-market and the second property sub-market is a single-family home sub-market.

5. The computer-implemented method of claim 1, wherein the first price index is calculated as derivations from the calculated second price index.

6. The computer-implemented method of claim 1, wherein the calculated error correction model is associated with a difference between the first price index and the second price index.

7. The computer-implemented method of claim 1, wherein calculating the error correction function is further based on at least one refinance bias.

8. A non-transitory computer-readable medium storing program instructions, which, when executed on at least one processor, causes the at least one processor to perform a method for generating a first price index for a first property sub-market based on first historical transaction data from the first property sub-market and second historical transaction data from a second property sub-market, the method comprising:
   calculating a second price index of the second property sub-market based on the second historical transaction data;
   calculating an error correction function based on the first historical transaction data and the second price index;
   calculating the first price index based on the error correction function and the second price index;
   forecasting a price of property in the first property sub-market based on the first price index; and
   storing the forecasted price in a memory device.

9. The computer-readable medium of claim 8, wherein the second historical transaction data includes more transactions than the first historical transaction data.

10. The computer-readable medium of claim 8, wherein the first property sub-market and second property sub-market are housing sub-markets.

11. The computer-readable medium of claim 10, wherein the first property sub-market is a condominium sub-market and the second property sub-market is a single-family home sub-market.

12. The computer-readable medium of claim 8, wherein the first price index is calculated as derivations from the second price index.

13. The computer-readable medium of claim 8, wherein the error correction model is associated with a difference between the first price index and the second price index.

14. The computer-readable medium of claim 8, wherein calculating the error correction function is further based on at least one refinance bias.

15. A system for forecasting a price of property, the system comprising:
   a first database storing first historical transaction data about a first property sub-market;
   a second database storing second historical transaction data about a second property sub-market;
   a computing platform configured to:
      calculate a second price index of the second property sub-market based on the second historical transaction data;
      calculate an error correction function based on the first historical transaction data and the second price index;
      calculate the first price index based on the error correction function and the second price index; and
      forecast a price of property in the first property sub-market based on the first price index; and
   an input/output device configured to provide the forecasted price to at least one user.

16. The system of claim 15, wherein the second historical transaction data includes more transactions than the first historical transaction data.

17. The system of claim 15, wherein the first property sub-market and second property sub-market are housing sub-markets.

18. The system of claim 17, wherein the first property sub-market is a condominium sub-market and the second property sub-market is a single-family home sub-market.

19. The system of claim 15, wherein the first price index is calculated as derivations from the second price index.

20. The system of claim 15 wherein the error correction model is associated with a difference between the first price index and the second price index.

21. The system of claim 15, wherein calculating the error correction function is further based on at least one refinance bias.

22. The system of claim 15, wherein the first database is different from the second database.

* * * * *